June 4, 1940.　　F. E. O'NEILL ET AL　　2,203,577
MEANS FOR MEASURING AND CONTROLLING FLUID PRESSURES
Filed Jan. 3, 1938　　2 Sheets-Sheet 2
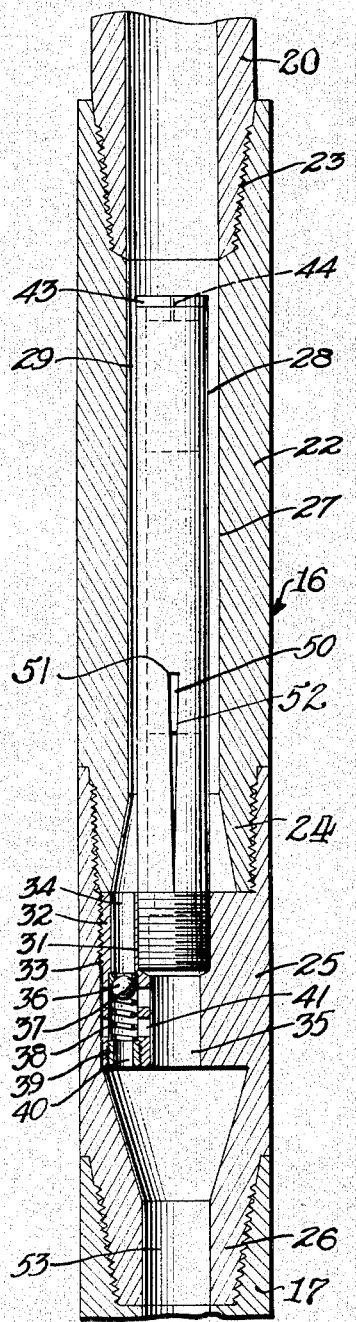
Fig. 3.
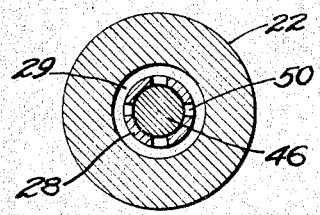
Fig. 4.
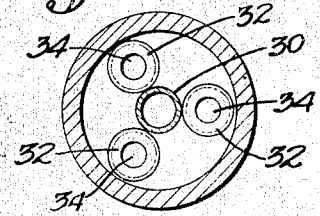
Fig. 5.
Fig. 6.
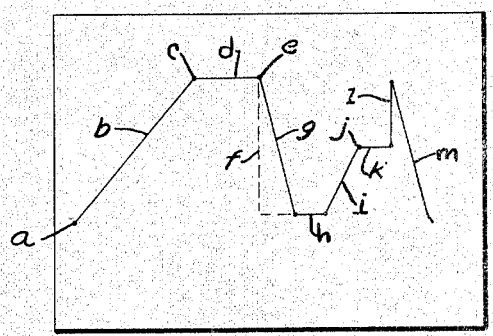
INVENTOR
FRANK E. O'NEILL
ROWLAND G. WHEALTON
BY James M. Abbett
ATTORNEY Patented June 4, 1940

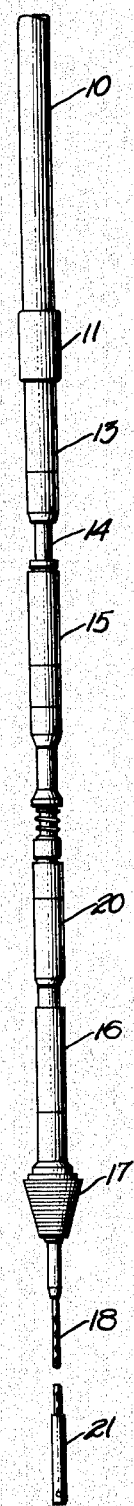
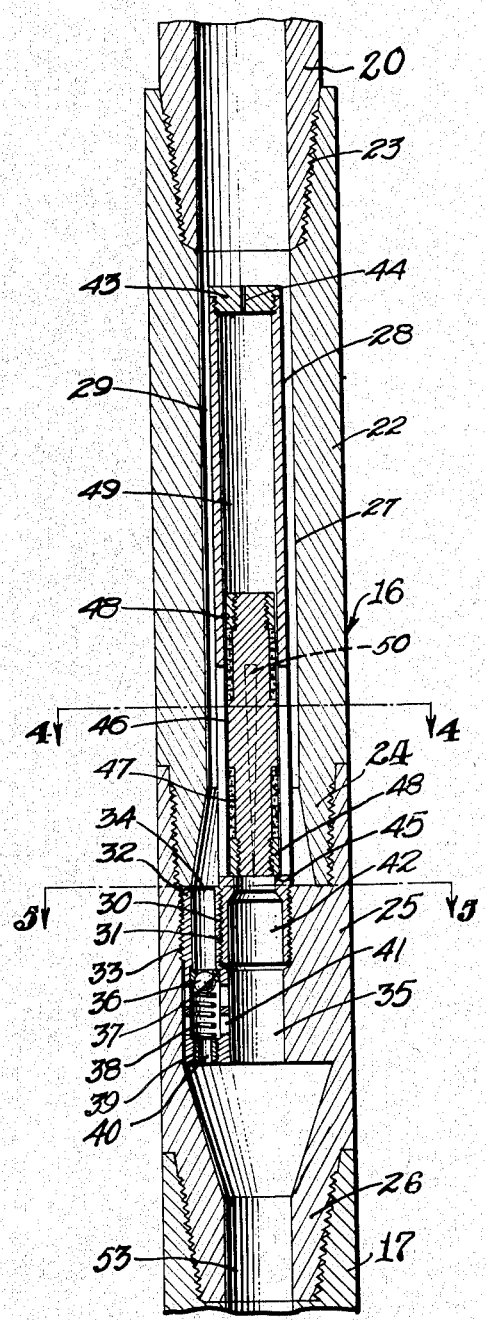

2,203,577

UNITED STATES PATENT OFFICE 2,203,577

MEANS FOR MEASURING AND CONTROLLING FLUID PRESSURES

Frank E. O'Neill, Glendale, and Rowland G. Whealton, Altadena, Calif., assignors to Mordica O. Johnston, Glendale, Calif.

Application January 3, 1938, Serial No. 183,156

8 Claims. (Cl. 166—1)

This invention relates to the boring and testing of oil wells and particularly pertains to means for measuring and controlling fluid pressures.

In the drilling of oil wells and in the testing of casing shoes for leaks it is common practice to use a testing device for making formation tests and for ascertaining whether or not a casing shoe has properly sealed the end of an oil well casing. In connection with these testing devices within which fluid may be entrapped, it is often the practice to associate a fluid pressure recording device with the testing tool so that the pressure of the fluid occurring below the packer of the testing tool may be ascertained while the assembled structure is being used to entrap a sample of the actual fluid present in the well prior to withdrawing it from the well. In the operations of such structures and particularly when they are used in making a test of the formation in the open well bore it is evident that the drilling fluid within the well will gradually increase in hydrostatic head as the pressure recording device is progressively lowered through the fluid to a seat in the formation, and that when the testing tool with its packer has been lowered and set on the formation seat, the pressure effect of the hydrostatic head of fluid within the well will be relieved but the fluid entrapped below the packer will be at a high pressure. When the valve of the tester is then suddenly opened the pressure of the entrapped fluid will be suddenly released as the fluid flows through the valve and up into the drill pipe, which pipe is at atmospheric pressure. This sudden pressure drop will impose an instant force upon the pressure recording mechanism which force will be of great magnitude and will tend to rupture the pressure responsive means or act upon it in a manner to cause it to take a permanent set in which case the pressure responsive means will then be inaccurate when used in subsequent tests. It is therefore desirable to provide means for preventing this sudden release of pressure or controlling the same for gradual release, and it is the principal object of the present invention to provide means which will automatically act to gradually release the fluid which is under pressure within the shut-in portion of the device, and which gradual release is here brought about by a structure with which the present invention is particularly concerned.

The present invention contemplates the provision of an automatically adjustable flow bean which acts in response to fluid under pressure to gradually open and permit fluid to flow through a conduit, the bean in the formation of the invention here shown being capable of use in combination with a well tester and a pressure recording device.

The invention is illustrated by way of example in the accompanying drawings in which:

Figure 1 is a fragmentary view in elevation showing a pipe to which is attached a form of well testing tool, together with a pressure recording device and automatic flow bean with which the invention is concerned.

Fig. 2 is an enlarged fragmentary view showing the adjustable flow bean unit in central longitudinal section and with the adjustable element in its closed position.

Fig. 3 is a view in partial central section of the flow bean unit shown in Fig. 2 with the sleeve shown in elevation and the adjustable bean element indicated by dotted lines as being in an open position.

Fig. 4 is a view in transverse section through the structure as seen on the line 4—4 of Fig. 2.

Fig. 5 is a view in transverse section as seen on the line 5—5 of Fig. 2 and shows the emergency circulating valve arrangement.

Fig. 6 is a graph showing the usual response of a pressure recording device in a well test and the response obtained by the use of the present invention.

Referring more particularly to the drawings, 10 indicates a pipe or drill string extending downwardly from the top of the well and provided with a collar 11 to which is attached a trip valve unit 13. This unit carries a mandrel 14 which extends downwardly into the housing 15 of a tester main valve structure. The trip valve structure 13 and the main valve structure 15 may be of any suitable design, although it is desirable to make it of the general type shown in Patent No. 2,073,107 issued to M. O. Johnston, March 9, 1937, and entitled Well testing method and apparatus therefor.

Mounted below the testing assembly is a flow bean structure 16 to which a packer 17 is attached and beneath which a perforated nipple 18 is disposed. Within the nipple, or within a section at a desired point between the trip valve and the nipple, such for example as the section 20, is a fluid pressure recording device 21 installed for example in the United States Patent No. 2,161,233 issued to Frank E. O'Neill, June 6, 1939, and entitled Well testing device. This device is characterized by the fact that it embodies a fluid pressure responsive element acting upon a chart to make a permanent record of the fluid pressure conditions existing within the well, such for example as shown in patent to Marx, No. 1,955,855, issued April 24, 1934. It is to be understood that while the flow bean structure is here shown and described as being used in connection with a well testing tool and a pressure recording device, that it is within the concept of the present invention to utilize the flow bean structure separately, or to use it in connection with a testing tool separately, or a pressure recording device separately. The details of construction of the various elements with which the flow bean structure may be used will not therefore be set forth, other than to state that the pressure recording device 21 is equipped with a fluid responsive element upon which the force of the pressure of the fluid within the well is imposed, and that the well testing tool is equipped with a valve mechanism which may be opened suddenly to permit fluid to flow into the well from the area below the packer to and through the testing tool structure and upwardly into the string of pipe 10. The automatic flow bean is particularly shown in Figs. 2 to 5 of the drawings where it will be seen that it comprises an outer tubular housing 22 having a threaded box 23 at its upper end and a threaded pin 24 at its lower end. It will of course be understood that these male and female connections may be reversed and that other coupling means may be utilized if desired. Connected to the pin 24 is a valve housing 25 which carries a pin 26 at its lower end. The tubular housing is formed with a central passageway 27 therethrough which receives a flow bean sleeve 28. The outer diameter of this sleeve is sufficiently less than the diameter of the central passageway to provide for an annular flow space 29 between the sleeve and the wall of the passageway. The sleeve has a threaded portion 30 at its lower end which is threaded into a central threaded bore 31 of a housing 25 and threadedly engaged with a plurality of spaced valve cages 32 seated in spaced threaded bores in housing 25. The valve cage 32 is preferably formed with an exterior thread and is threaded into the valve housing 25 as indicated at 33. The valve cages are each formed with a longitudinally extending passageway 34, and are arranged in circular spaced relation to each other around a central passageway 35, the wall at the upper end of which carries the threads 30. The passageways 34 are bypass circulating passageways to be used for emergency purposes, and are held normally in a closed position by valve balls 36 which bear against valve seats 37. Springs 38 yieldably hold the balls in place and these springs are in turn held in position by hollow threaded thimbles 39 mounted in the lower ends of the passageways 34. Each of these thimbles thus provides an opening 40 for the flow of fluid. Other openings 41 are formed through the side walls of the bore 34 at points below the position of the valve balls 36 and their seats 37 and above the thimbles 39.

An interior passageway 42 is formed through the flow bean sleeve 28. This passageway is open at its lower end and at its upper end is fitted with a closure disc 43 which is threaded into the upper end of the sleeve 28 to close the same and is provided with a relief duct 44. The duct 44 is relatively small in diameter as compared with the diameter of the passageway 42 and will thus retard the flow of fluid from within the sleeve 28 for a purpose to be hereinafter set forth. At a suitable position adjacent the lower end of the passageway 42 an annular inwardly extending shoulder 45 is provided. This shoulder limits the downward movement of a freely reciprocable flow bean element 46 positioned within the sleeve 28. The flow bean element substantially fits within the bore 42 above the shoulder 45 and is provided with ring-shaped packing members 47 which form a fluid tight seal between the flow bean element 46 and the inner circumferential wall of the passageway 42. The packing members are held in position by nuts 48 which are threaded on to the opposite end of the valve element 46. It will thus be seen that by this arrangement the valve element 46 acts as a piston reciprocable within dash-pot 49 occurring within the sleeve 28 between the upper end of the member 46 and the closure disc 43. Formed through the side walls of the flow bean sleeve 28 are a plurality of V-shaped flow bean slots 50. As shown in Fig. 4 of the drawings four such slots are provided. It will be understood that the number of slots may be selected for the particular work to be done. Each of these slots is in the form of an inverted equilateral triangle, the base portion 51 of which is uppermost and the side walls 52 of which diverge uniformly and equally from the apex of the triangle upwardly while the slots themselves are longitudinally aligned with relation to the central axis of the sleeve 28. Thus as the valve element 46 moving upwardly the slots will be progressively uncovered and will progressively increase in area in relation to the pressure exerted by the fluid entering the passageway 35 and passing into the lower end of the sleeve passageway 42.

In the operation of the present invention the specific operation of the automatic flow bean unit will be described first with reference to Figs. 2 and 3. It will be seen that fluid under pressure will be admitted through the passageway 53 at the lower end of the valve housing 25. This fluid then flows upwardly through passageway 35 into the lower open end of passageway 42 of the flow bean sleeve 28. The pressure of this fluid will be exerted against the end face of the reciprocating valve element 46, which element is held in its lowermost position by gravity. It may also occur that the dash-pot 49 has been previously filled with a liquid so that when the valve member 46 is moved the liquid within the dash-pot 49 will be displaced through the relief passageway 44. Due to the restricted size of the opening 44 the movement of the valve element 46 will be retarded. As the valve element 46 moves upwardly under influence of the pressure of the fluid below the valve element the slots 50 will progressively open.

When a flow bean of the automatic type as here shown is assembled in connection with a well testing device, such as the units generally indicated at 13 and 15, or with such a device and a pressure recording device, such as generally indicated at 21, the automatic flow bean unit 18 is disposed at a point below the trip valve 13 and preferably below the main valve unit 15. At this point attention is directed to the fact that the automatic flow bean may be used to advantage with a testing structure alone, for in such a case the sudden release of fluid pressure from beneath the packer 17 and through the drill string 10 to atmospheric pressure causes an objectionable surge of fluid which may disturb the structure and the stability of the geological formation from which the fluid flows. This would tend to cause a cave-in and to cause debris to flow into the perforated nipple and tend to clog the same. By the use of the flow bean with a testing device the inrush of fluid would be gradually resisted and controlled in a manner to eliminate an objectionable surge of fluid or a sudden evacuation of fluid from the testing area. When the pressure recording device is used with the testing tool and the pressure is suddenly released the automatic flow bean will act in the same manner but will prevent sudden shock from being imposed upon the instrument. This is illustrated in the graph shown in Fig. 6 of the drawings, where *a* indicates the point at which the tool is started down into the well and into the fluid column with which the well is filled. As the hydrostatic head increases the graph line *b* will be gradually formed on the pressure recording chart. The point *c* indicates the position at which the packer 17 is set. The line *d* indicates the interval at which the packer shuts off the column. The point *e* indicates the point at which the trip valve in the trip valve unit 13 is suddenly opened. The dotted line *f* indicates the usual graph line made when the trip valve is suddenly opened and the pressure instantly drops as the pressure fluid passes upwardly through the trip valve and into the stem or tubing 10. The line *g* indicates the graph line made when the automatic flow bean 16 is utilized with the structure. Here it will be seen that the pressure is gradually relieved as compared with the sudden relief indicated by the dotted line *f*. The graph line *h* indicates the pressure during the period while the tester valves are held open and direct communication is established between the pipe 10 and the area below the packer 17. The graph line *i* indicates the progressive building up of pressure through the flow bean structure 16 after the valve in the main valve unit 15 has been closed, but before the packer 17 is withdrawn from its seat. Thus the point *j* will indicate the closed-in pressure of the well. The line *k* indicates the period the closed-in pressure is held while the line *l* indicates the increased pressure after the packer has been withdrawn from its seat and the pressure of the fluid column has been reimposed upon the full length of well, and the line *m* indicates the gradual reduction in pressure as the tool is withdrawn from the well and elevated in the fluid column.

The circulation in an oil well is temporarily interrupted during the making of the test since the packer 17 is set in the well. Under some emergencies it is desirable to instantly re-establish circulation. That is done in the present case by forcing drilling fluid down through the stem 10 and the packing tool to deliver a downward pressure against the valve balls 36 so that fluid may flow through the passageways 34 and thence downwardly and outwardly through the perforated nipple into the well bore. The packer when raised will permit this fluid to then flow up around the pipe 10 to the top of the well. This will aid in dislodging the packer if it has become stuck in the well and will prevent loss of the tools within the well bore.

It will thus be seen that the method of procedure here shown and the apparatus utilized for carrying out this method, provide simple and effective automatically acting means for permitting a gradual increase in pressure to be imposed upon fluid responsive means, and also for permitting a gradual release of pressure from an area of high pressure to a lower pressure area without creating a violent disturbance or force which would be detrimental to the area from which the pressure was relieved, or which would tend to damage or render inaccurate the fluid responsive means.

While we have shown the preferred form of apparatus with which the present invention may be practiced, and have described the preferred method of procedure for utilizing said apparatus, it is to be understood that various changes might be made by those skilled in the art in the construction of the apparatus without departing from the spirit of the invention as claimed.

Having thus described our invention, what we claim and desire to secure by Letters Patent is:

1. In combination, a string of pipe adapted to be lowered into a well and being in communication with the atmosphere at its upper end, a testing tool carried at the lower end of the string of pipe, said tool having a passageway therethrough, a valve normally closing the passageway, a packer carried by the tool to form a fluid tight seal between the wall of the well bore around the testing tool, a metering valve disposed in the path of fluid flowing through the testing tool when its valve is opened, said metering valve comprising a perforated element through which fluid may flow from beneath the testing tool to the string of pipe thereabove, a valve element positioned within said perforate element moving in relation to the member having the perforated openings and being capable of progressively increasing the area of the fluid passageway through the perforated openings as the movable valve element is moved by the pressure of the fluid exerted thereagainst and which fluid flows from the area beneath the testing tool to the string of pipe thereabove, and means yieldably resisting the movement of the movable valve element.

2. A metering valve structure for use in combination with oil well testing apparatus comprising an outer tubular housing through which a fluid may flow, a tubular valve sleeve mounted within said housing and being spaced therefrom, the lower end of the valve sleeve forming a seal with the housing, and the wall of said valve sleeve having passageways therethrough to permit fluid to pass in through the lower end and then outwardly through the passageways in the sleeve and upwardly through the housing, a movable valve member slidable within the sleeve to control the effective size of the passageways through the sleeve, said movable valve element being automatically responsive to fluid under pressure to move it to an opened position in direct proportion to said pressure whereby the volume of fluid passing through the structure will be automatically metered in direct relation to its pressure, a passageway around the seal between the valve sleeve and the housing whereby fluid may flow directly through the housing without flow through the valve sleeve, and a check valve in said passageway for permitting fluid to flow therethrough in a counterdirection to the normal direction of the flow of fluid through the housing and the valve sleeve.

3. A metering valve structure for use in combination with oil well testing apparatus comprising an outer tubular housing through which a fluid may flow, a tubular valve sleeve mounted within said housing and being spaced therefrom, the lower end of the valve sleeve forming a seal with the housing, and the wall of said valve sleeve having passageways therethrough to permit fluid to pass in through the lower end and then outwardly through the passageways in the sleeve and upwardly through the housing, a movable valve member slidable within the sleeve to control the effective size of the passageways through the sleeve, said movable valve element being automatically responsive to fluid under pressure to move it to an opened position in direct proportion to said pressure whereby the volume of fluid passing through the structure will be automatically metered in direct relation to its pressure, a passageway around the seal between the valve sleeve and the housing whereby fluid may flow directly through the housing without flow through the valve sleeve, and a check valve in said passageway for permitting fluid to flow therethrough in a counterdirection to the normal direction of the flow of fluid through the housing and the valve sleeve, said movable valve element being in the form of a reciprocating piston mounted within the sleeve, the sleeve being formed with a dash-pot at its upper end to yieldably resist the movement of the piston.

4. In combination with a string of pipe adapted to be lowered into a well bore, said pipe having communication with the well bore at its lower end, a fluid flow regulating and metering device interposed in the lower end of said string of pipe, said fluid flow regulating device including a conduit establishing communication between the high pressure area of the well bore below said device and the low pressure area of the drill string above said device, a valve structure therein having a perforate valve shell, said valve shell being closed at its upper end, a movable valve element within said shell adapted to move in response to the fluid pressure in the high pressure area below said structure to cause the perforations in the shell to be progressively uncovered in direct relation to the pressure exerted upon the movable valve element by the fluid pressure, fluid control means comprising a relatively small opening in the closed end of said shell for yieldably resisting movement of the valve element as fluid pressure is exerted against the valve element to move the same whereby said valve will be gradually opened.

5. A fluid flow regulating and metering device for use in combination with a string of drill pipe carrying a well packer thereon, said flow device comprising a tubular sleeve having a central passageway connected to said drill pipe below said packer establishing communication between the high pressure area created when said packer is set to the low pressure area above said packer and within said string of drill pipe, a valve structure positioned within said passageway having a perforate valve shell, said valve shell being closed at its upper end, a movable valve element therein adapted to move in response to fluid pressure exerted by the high pressure area beneath said packer whereby the perforations in the valve shell will be progressively uncovered in direct relation to the pressure exerted upon the valve element by the pressure fluid, and fluid control means comprising a relatively small opening in said closure at the upper end of the shell for yieldably resisting movement of the valve element as fluid pressure is exerted against the valve element.

6. A fluid flow regulating and metering device for use in combination with a string of drill pipe carrying a well packer thereon, said flow device comprising a tubular sleeve having a central passageway connected to said drill pipe below said packer establishing communication between the high pressure area created when said packer is set to the low pressure area above said packer and within said string of drill pipe, a valve structure positioned within said passageway having a perforate valve shell, said valve shell having a closure at its upper end, a movable valve element therein adapted to move in response to fluid pressure in the high pressure area beneath said packer whereby the perforations in the valve shell will be progressively uncovered in direct relation to the pressure exerted upon the valve element by the pressure fluid, fluid control means comprising a relatively small opening in said closure at the upper end of the shell for yieldably resisting movement of the valve element as fluid pressure is exerted against the valve element, and a normally closed valve means adapted to be opened by pressure exerted from the lower pressure area to the high pressure area to establish a counter-flow of fluid through the drill string.

7. In combination with a string of pipe adapted to be lowered into a well bore, said pipe having communication with the well bore at its lower end, a fluid flow regulating and metering device interposed in the lower end of said string of pipe, said fluid regulating device including a conduit establishing communication between the high pressure area of the well bore below said device and the low pressure area of the drill string above said device, a valve structure therein having a perforate valve shell, a closure for the upper end of said valve shell having a relatively small opening therethrough, a movable valve element within the said shell adapted to move in response to the fluid pressure in the high pressure area below said structure to cause the perforations in the shell to be progressively uncovered in direct relation to the pressure exerted upon the movable valve element by the pressure of fluid within the high pressure area, said opening of the shell closure yieldably resisting movement of the valve element as fluid pressure is exerted against the valve element to move the same whereby said valve will be gradually opened.

8. In combination with a string of pipe adapted to be lowered into a well bore, said pipe having communication with the well bore at its lower end, a fluid flow regulating and metering device interposed in the lower end of said string of pipe, said fluid regulating device including a conduit establishing communication between the high pressure area of the well bore below said device and the low pressure area of the drill string above said device, a valve structure therein having a perforate valve shell, a closure for the upper end of said valve shell having a relatively small opening therethrough, a movable valve element within the said shell adapted to move in response to the fluid pressure in the high pressure area below said structure to cause the perforations in the shell to be progressively uncovered in direct relation to the pressure exerted upon the movable valve element by the pressure of fluid within the high pressure area, said opening of the shell closure yieldably resisting movement of the valve element as fluid pressure is exerted against the valve element to move the same whereby said valve will be gradually opened, and a normally closed valve means comprising a passageway around the seal between the valve sleeve and the central passageway of the tubular sleeve whereby fluid may flow directly through the housing without flow through the valve sleeve, said valve means being operated by pressure exerted by a counter flow of fluid from the low pressure area to the high pressure area to establish a flow of fluid in a counter direction to the normal direction of flow of fluid through the housing and the valve sleeve.

FRANK E. O'NEILL.
ROWLAND G. WHEALTON.